United States Patent [19]

Kitsunezaki

[11] 4,207,961

[45] Jun. 17, 1980

[54] EXCITING METHOD FOR LOGGING BY S WAVE

[75] Inventor: Choro Kitsunezaki, Akita, Japan

[73] Assignee: Oyo Corporation, Tokyo, Japan

[21] Appl. No.: 946,830

[22] Filed: Sep. 28, 1978

[30] Foreign Application Priority Data

Feb. 9, 1978 [JP] Japan .................................. 53-13921

[51] Int. Cl.² ............................................. G01V 1/14
[52] U.S. Cl. ..................................... 181/106; 181/120;
181/402; 340/853
[58] Field of Search ............... 181/119, 120, 402, 102,
181/104, 105, 106; 340/15.5 SW, 12 R

[56] References Cited

U.S. PATENT DOCUMENTS

| | | | |
|---|---|---|---|
| 4,038,631 | 7/1977 | Murphy | 181/119 |
| 4,042,063 | 8/1977 | Waters | 181/119 |
| 4,105,993 | 8/1978 | Grassy et al. | 340/15.5 SW |

*Primary Examiner*—Howard A. Birmiel

*Attorney, Agent, or Firm*—Wenderoth, Lind & Ponack

[57] ABSTRACT

An exciting method for a logging by means of S wave is provided which includes inserting a wave source into a bore hole containing water and actuating an operating mechanism in the wave source to impart an exciting force to the bore hole wall in the direction perpendicular to the axis of the bore hole, so as to generate the S wave having characteristics of predominant radiation in the direction perpendicular to the axis of the exciting force. The improvement of the invention comprises abruptly ejecting the water at one side of the wave source intersecting the extension of the axis of the exciting force, while, simultaneously at the opposite side of the wave source, abruptly sucking the water of equivalent volume to that ejected at the first mentioned side, whereby a positive and negative pressure change are indirectly applied through the medium of the water to the two respective sides of the bore hole wall intersecting the extension of the exciting force axis.

3 Claims, 7 Drawing Figures

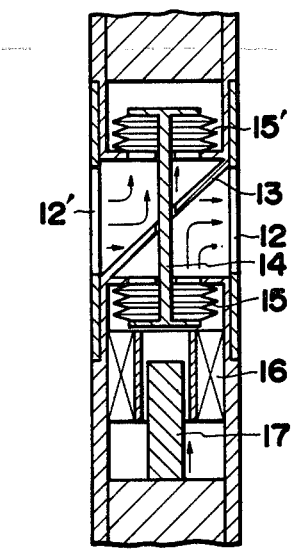
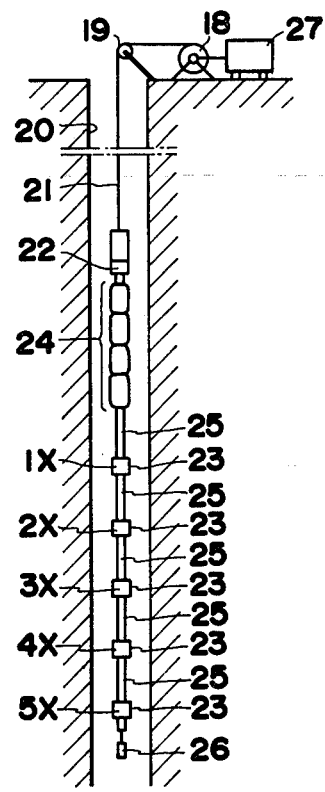
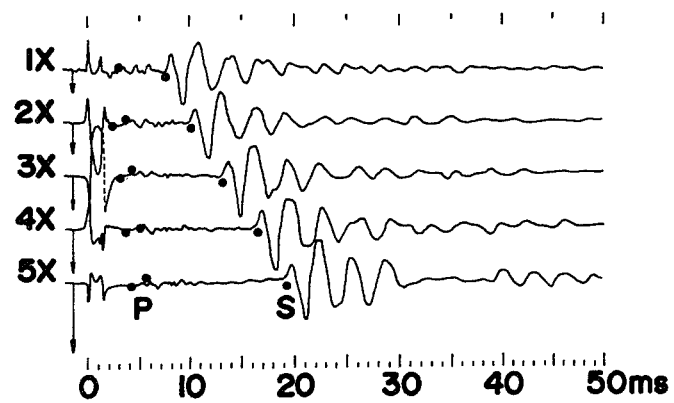

EXCITING METHOD FOR LOGGING BY S WAVE

BACKGROUND OF THE INVENTION

The present invention relates to a method of generating S wave in ground formation for the purpose of a geological survey and the like.

As well known to those skilled in the art, the elastic waves propagated through the ground consist of three types, namely longitudinal wave (P wave), shear wave (S wave) and surface wave. Thus, the term "S wave" is used throughout the specification to mean the shear wave of the elastic waves.

A method has been mainly used in the field of seismic technology and gelogical survey, which includes inserting a wave source in a bore hole, and actuating an operating mechanism in the wave source to impart a exciting force to the wall of the bore hole in the direction perpendicular to the axis of the bore hole, thereby to generate S wave having characteristics of predominant radiation in the direction perpendicular to the axis of the exciting force. This method is actually accomplished by (1) directly striking the wall of the bore hole by means of a hammer, or (2) by generating an explosive fluid pressure to impart an impact to the wall of the bore hole.

However, the above-mentioned method (1) relying upon a direct mechanical impact inconveniently requires a special mechanism for securing the wave source to the wall of the hole. In addition, the handling and operation of the wave source is extremely difficult especially when the wave source is inserted to a large depth. Also, the crumbling of the hole wall is likely to occur when the wave source is operated in the hole.

The second method (2) is to generate an explosive fluid pressure in a rigid casing having an opened window by means of powder explosion, abrupt release of gas pressure or rapid gasification of liquid by high-voltage discharge and to erupt the pressure through the aforementioned window to a portion of the hole wall facing the window. Thus, the nature of the impact to the portion of the hole wall is fundamentally equivalent to that of the first method; rather, the second method involves additional problems. They are that (a) the volume change of the water surrounding the wave source is more likely to induce the generation of the obstructive waves, namely P wave and tube wave;

(b) the use of high-voltage is apt to generate undesirable induction noises; and (c) the electric discharge and release of compressed gas at a large depth require complex mechanisms and sophisticated control device. Due to these problems the application of the second method is inevitably limited.

In these methods, it is presupposed that the wave length of the generated wave is sufficiently longer than the hole diameter, and hence the wave detected by receivers is the direct S wave. In fundamental aspects, these points are also available in the present invention.

On the other hand, there is also an S wave logging method belonging to other category, completely different from that of the above methods, in which the wave length of the generated wave is shorter than or comparable to the hole diameter. In this method, a P wave is originally emitted to surrounding water from a source having characteristics of omni-directional radiation, and then at the hole wall near the source, this wave is converted to S wave propagating in solid formation along the hole wall. This S wave is then refracted to water in the hole as P wave, which is detected by receivers. In essential meaning, a logging of this type is "a conventional sonic log" modified to detect later phases, where the refracted S wave (P→S→P) also appears as by-production of P wave in favourable conditions. This method has such a restriction in application that characteristics of the refracted S wave are disturbed by near wall condition of the formation including drilling effects and it cannot be applied to formations of lower S wave velocity.

SUMMARY OF THE INVENTION

It is therefore the primary object of the invention to provide an improved and easily workable method of the excitation which is able to minimize the possible change in volume of water surrounding the immediate vicinity of the wave source in the bore hole when the exciting force is employed for generating S wave, thereby to reduce the incidental generation of the obstructive waves to the maximum extent possible.

In order to accomplish this object, according to the invention, water in the bore hole is abruptly ejected at one side of the wave source intersecting the extension of the axis of exciting force, while, simultaneously at the other side of the wave source intersecting the extension of the exciting force axis, i.e. at the opposite side of the wave source to the first mentioned side, an equivalent volume of water to that ejected at the first mentioned side is sucked. Consequently, a positive and negative pressure change are indirectly applied to the two respective sides of the bore hole wall intersecting the extension of the exciting force axis, through the medium of the water in the hole.

Thus, in the present invention, the excitation is produced by a pair of positive and negative pressure changes. In other words, this wave source is a doublet type. Therefore, the change in the volume of the water as a whole surrounding the immediate vicinity of the wave source in the hole is conveniently offset or cancelled, so that the obstructive waves attributable to the volume change of the water are effectively suppressed.

Even if there is slight mutual interference caused by circulating flow of water between the ejecting and sucking of water taking place at opposite sides of the wave source, it will still be possible to generate a pair of positive and negative pressure changes large enough to impart the required excitation to the walls of the bore hole intersecting the axis of the exciting force, by making the acceleration of the ejecting and sucking motion sufficiently high.

Further, since the walls of the bore hole are indirectly pressured through the medium of water to generate the S wave, it is not necessary to directly secure the wave source to the hole wall. Consequently, the equipment for fixing the wave source to the wall and the troublesome operation accompanied by it are eliminated.

At the same time, the crumbling of the hole wall which might be caused during the fixing of the wave source, can be avoided. Thus, the method of the present invention may be effectively used to generate the S wave even under an extremely high water pressure caused by a large bore hole depth of, for example, several thousand meters.

BRIEF DESCRIPTION OF THE DRAWINGS

FIG. 5 is a vertical sectional view of another wave source;

FIG. 6 is a schematic illustration of a linear probe constituted by a wave source and an array of detectors; and FIG. 7 illustrates a record obtained as a result of a test conducted employing the apparatus as shown in FIG. 6.

PREFERRED EMBODIMENTS OF THE INVENTION

Figure 1:
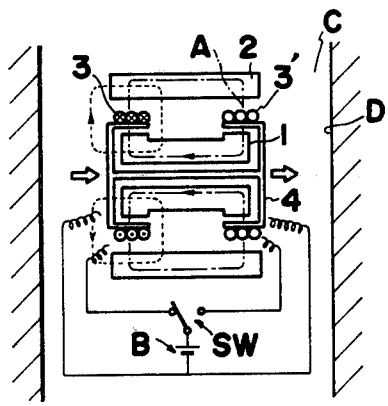
FIG. 1 is a schematic vertical sectional view of an embodiment of an apparatus for carrying out the method of the invention.

Referring now to FIG. 1 illustrating a basic arrangement of an embodiment of an apparatus for carrying out the method of the invention, a magnetic field A is formed by a permanent magnet 1 and a yoke 2 made of pure iron which are fixed in relation to each other. A bobbin assembly 4 provided with coils 3, 3' at both ends is slidably disposed in the magnetic field A.

When a switch SW is in the illustrated position, an electric current is supplied by a power supply B to the coil 3, so as to produce a force to drive the bobbin assembly 4 in the direction of the arrows. On the other hand, when the switch is connected to the other side, the electric current is supplied to the coil 3' to generate a force which drives the bobbin assembly 4 in the opposite direction. Thus, the bobbin assembly 4 can be driven in either direction. It will be understood that, when the bobbin is driven, a certain ejected volume and a corresponding and equivalent sucked volume are produced at the respective sides of the bobbin assembly 4.

In the illustrated embodiment, only one of the coils 3, 3' is energized for driving the bobbin assembly 4 in one direction, so that the permanent magnet is not to be demagnetized by the magnetomotive force due to a large current supplied into the coils, but, rather, the magnetization of the permanent magnet is enhanced. Thus, such consideration is not necessary if the magnetization of the permanent magnet is stable and strong enough to overcome the adverse effect of the magnetomotive force produced by the coils.

Figure 2:
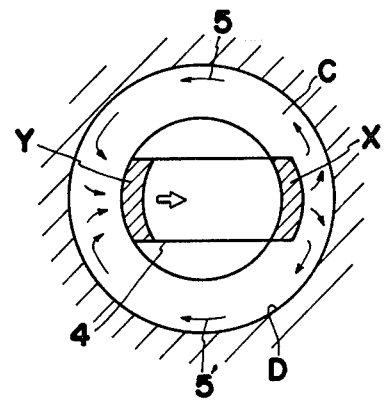
FIG. 2 is a horizontal sectional view of the apparatus as shown in FIG. 1.

It is assumed here that the wave source having the above-explained construction is inserted deep into a bore hole D containing water C, and the bobbin assembly 4 is driven in the direction of arrows with a sufficiently high acceleration, as shown in FIGS. 1 and 2. As the bobbin assembly 4 is moved in the direction of the arrows, i.e. in the direction perpendicular to the axis of the hole, an ejected volume X is formed at one side of the bobbin assembly so that the portion of the hole D confronting the bobbin assembly 4 is indirectly pushed through the medium of the water C (see FIG. 2). At the same time, a sucked volume Y equivalent to the ejected volume X is formed at the other side of the bobbin assembly 4, so that the portion of the wall of the hole D confronting the other side of the bobbin assembly 4 is indirectly pulled, i.e. negatively pressured, through the medium of the water C. Consequently, the ejected water is made to flow around the wave source as circulating flows 5, 5'. However, since the acceleration of movement of the bobbin assembly 4 is sufficiently high as stated before, a positive and negative pressure change strong enough to provide the required S wave amplitude can be produced.

To move the bobbin assembly with sufficiently high acceleration, it is preferred to make the mass of the bobbin assembly sufficiently small. A reaction force acting on the permanent magnet 1 and the yoke 2 as a result of the propulsion of the bobbin assembly 4 tends to move a framework including the permanent magnet 1 and the yoke 2 in the direction opposite to the direction of movement of the bobbin assembly 4. However, the displacement of the magnet 1 and the yoke 2 can be made negligibly small by attaching a weight of large mass to the framework including the yoke 2 and the permanent magnet 1.

According to the present invention, no change of volume surrounding the immediate vicinity of the wave source takes place, so that almost no P wave is generated in the direction perpendicular to the axis of the exciting force. Further, the method of the present invention is only to displace the water sideways, and does not include any work against the external pressure. Therefore, this method can be effectively carried out even under a high pressure in a deep bore hole. In addition, there is no need to fix the wave source to the wall of the hole.

Figure 4:
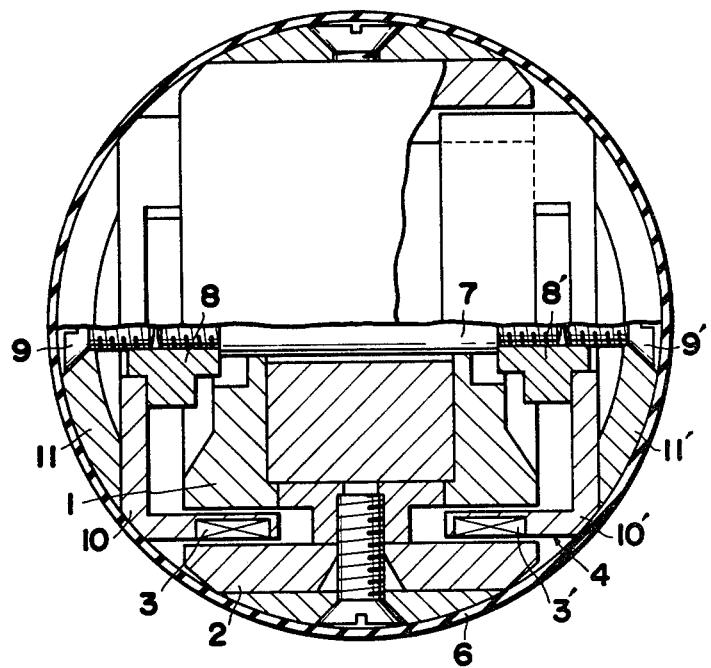
FIG. 4 is a horizontal sectional view of the wave source based on the principle as illustrated in FIG. 1.

In practical use, the wave source is suitably covered or enclosed by a rubber tube 6, as shown in FIG. 4, so as to prevent the invasion of ambient water. The space inside the rubber tube 6 may be filled with an insulating oil, if necessary.

In the illustrated embodiment shown in FIG. 4, the bobbin assembly 4 includes a shaft 7, connecting members 8, 8' screwed to the respective ends of the shaft 7, bobbin members 10, 10' attached to the respective coils 3, 3' and curved members 11, 11'. The bobbin members 10, 10' and the curved members 11, 11' are secured to the shaft 7 by means of flush head screws 9, 9' screwed into the respective connecting members 8, 8'.

Figure 3:
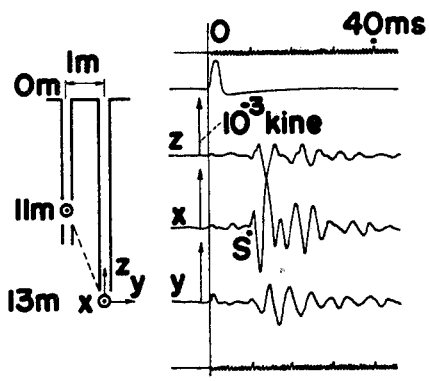
FIG. 3 is an illustration of the result of a test conducted employing a wave source as shown in FIG. 4.

FIG. 3 shows the result of a field test conducted employing the above-described source apparatus in an alluvial layer. Two bore holes of 66 mm dia. were drilled at a distance of 1 m from each other. The apparatus was suspended in one of the bore holes to the depth of 11 m, while a fixed-type detector having x, y and z components was installed in the other bore hole at a depth of 13 m, so as to abserve the propagation of S wave.

The voltage, current and the pulse width of the electric power supplied to the coils were 85 V, 8.5 A and 2 mS, respectively. In FIG. 3, the lengths of arrows on the record represent the approximate sensitivities in the frequency regions of these wave forms, while the direction of the arrows expresses polarities corresponding to the positive directions of x, y and z axes of the detector. Thus, the direction of the exciting force is the direction x which is normal to the plane of the drawing. The vibration of S wave is expected to be predominant in a trace of x component, in which direction the axis of the excitation force is set. This fact is assured in FIG. 3, in which the minor vibrations in y and z components were analized as secondary phenomenon due to elastic waves radiated from the wave propagating along water column in the source hole. Furthermore, it is concluded that the method of the present invention, which relies upon a transmission of an excitation from a wave source to the wall of the bore hole through the medium of water, can provide power strong enough to permit successful logging by S wave.

In the above-described embodiment, the bobbin assembly is moved in the direction perpendicular to the bore hole axis, so as to pressure the two portions of bore hole wall intersecting the extension of the axis of the exciting force positively and negatively at the same time. However, such an arrangement is not exclusive. Namely, for instance, the method of the invention may be such that at first the liquid is displaced in the axial direction of the bore hole and then this axial displacement of the liquid is converted into a displacement perpendicular to the axis of the bore hole.

Another embodiment of the apparatus for carrying out the method of the present invention through the above mentioned conversion is shown in FIG. 5. This apparatus has a cylindrical case having two windows 12, 12' opening in its lateral sides. These two windows are separated from each other by an inclined partition plate 13. Thus, the apparatus as a whole is devided by the partition wall 13 into an upper section having the window 12' and a lower section having the window 12. Bellows 15 and 15' which are operatively connected to each other by a rod 14 extending through the partition plate 13, are disposed in the lower and upper sections, respectively.

In operation, as a solenoid 16 is energized, a plunger 17 is driven into collision with the bellows 15, so as to abruptly compress the latter. Consequently, the water in the bellows 15 is ejected upward and then deflected sideways by the partition plate, and finally discharged through the window 12. At the same time, the bellows 15' is abruptly stretched to such an equivalent volume of water to that ejected by the bellows 15. It will be understood that, also in this case, the total volume change of the water surrounding the immediate vicinity of the wave source is minimized, so that almost no obstructive wave is generated.

In practical use of the method in the logging by means of S wave, it is preferred to arrange the wave source in the form of a linear probe, together with detectors, the probe being suspended in the drilled hole to facilitate successive logging at different depths. In such a case, it is recommended to use suspension-type detectors which have been proposed by the present inventor, see "Shear Wave Logging by Suspension-type Geophone", BUTSURI-TANKO (GEOPHYSICAL EXPLORATION), Vol. 28, No. 1, p13-21 (1975) and vol. 28. No. 3, p 22-32 (1975).

FIG. 6 shows, by way of example, the construction of the linear probe.

A cable 21 is laid out from a reel 18 and, after passing a pulley 19, suspended in the drilled hole 20. A wave source 22 and an array of detectors 23 are attached to the cable 21. However, in a experiment which was conducted to obtain a record as shown in FIG. 7, a PU cable, a wave source cable and an air hose were used separately.

An air-contained rubber tube 24 and an array of rubber tubes 25 are connected between the wave source 22 and the detectors 23. The air-contained rubber tube 24 is used to isolate the detector from a tube wave which may be generated when the impact is given by the wave source to the water, while the rubber tubes 25 are used to align the detection axes of the detectors 23 with the direction of the exciting force caused by the wave source 22. A weight 26 attached to the lower end of the probe is used for facilitating the insertion of the probe into the bore hole. A weight may be installed in the wave source for minimizing the displacement attributable to the reaction. A controlling and recording device is generally designated by a reference numeral 27.

FIG. 7 shows, by way of example, a record on an X-Y recorder, obtained as the result of a test conducted employing the above-illustrated linear probe in a tertiary mudstone formation. The excitation was imparted in x direction at a depth of 24 m. The uppermost detector 1X was spaced 3.2 m away from the wave source, while the successive detectors 2X, 3X, 4X and 5X were positioned at an interval of 1 m. The voltage, current and pulse width of the power applied to the wave source coil were 400 V, 20 A, and 1.2 mS, respectively. In FIG. 7, a predominant phase is the S wave whose first kicks are marked with S, while a faint phase marked with P is the P wave.

It is to be realized that only preferred embodiments of the invention have been disclosed and that numerous modifications, substitutions and alterations are all permissible without departing from the spirit and scope of the invention as defined in the following claims.

What is claimed is:

1. In an exciting method for a logging by means of S wave which includes inserting a wave source into a bore hole containing water and actuating an operating mechanism in the wave source to impart an exciting force to the bore hole wall in the direction prependicular to the axis of the bore hole, so as to generate the S wave having characteristics of predominant radiation in the direction perpendicular to the axis of the exciting force, the improvement comprising abruptly ejecting the water at one side of the wave source intersecting the extension of the axis of the exciting force, while, simultaneously at the opposite side of the wave source, abruptly sucking the water of equivalent volume to that ejected at the first mentioned side, whereby a positive and negative pressure change are indirectly applied through the medium of the water to the two respective sides of the bore hole wall intersecting the extension of the exciting force axis.

2. The exciting method according to claim 1, wherein said ejecting and sucking of the water are made directly in the direction perpendicular to the axis of the bore hole.

3. The exciting method according to claim 1, wherein said ejecting and sucking of the water are made directly in the direction of the axis of the bore hole and then the resultant movement of water is deflected and converted into a movement of water in the direction perpendicular to the bore hole axis.

* * * * *